United States Patent [19]

Nii

[11] Patent Number: 4,985,259

[45] Date of Patent: Jan. 15, 1991

[54] METHOD OF MANUFACTURE OF FERMENTED SOYBEAN FOOD WITHOUT COOKING

[76] Inventor: Satoshi Nii, 18-7, Seijo 9-chome, Setagaya-ku, Tokyo, Japan

[21] Appl. No.: 440,811

[22] Filed: Nov. 24, 1989

[30] Foreign Application Priority Data

Jan. 18, 1989 [JP] Japan ............................. 1-9093

[51] Int. Cl.$^5$ ............................................. A23L 1/20
[52] U.S. Cl. ....................................... 426/46; 426/52; 426/64
[58] Field of Search ............................. 426/46, 52, 64

[56] References Cited

U.S. PATENT DOCUMENTS

| | | |
|---|---|---|
| 3,647,484 | 3/1972 | Yokotsuka et al. .................. 426/46 |
| 3,764,708 | 10/1973 | Aonuma et al. ...................... 426/46 |
| 4,119,733 | 10/1978 | Hsieh et al. ............................ 426/46 |
| 4,311,715 | 1/1982 | Oka et al. .............................. 426/46 |

*Primary Examiner*—Marianne Cintins
*Attorney, Agent, or Firm*—Goodman & Teitelbaum

[57] ABSTRACT

Fermented soybean food without cooking is produced by roughly breaking soybean into about $\frac{1}{2}$-$\frac{1}{8}$ in size, taking off the coat and germ, feeding the roughly broken soybean into a sealed vessel, and after introducing steam at or under 1 Kg/cm$^2$ for 3-20 minutes to avoid cooking the broken soybean, rapidly discharging the broken soybean from the sealed vessel to the outside normal atmospheric pressure and making puff, and by grinding it into powder, sprinkling hot water of 80°-95° C. onto the powder to avoid cooking the powder, and inducing fermentation by adding malt and salt.

2 Claims, No Drawings

METHOD OF MANUFACTURE OF FERMENTED SOYBEAN FOOD WITHOUT COOKING

BACKGROUND OF THE INVENTION

1. Field of the Invention

This invention relates to a method of manufacture of a new fermented soybean food which is similar to bean paste (miso), and more particulary to a method of manufacture of a new soybean fermented food in that, in comparison with the conventional miso, no harmful waste water is generated, and a small quantity of fuel is sufficient in the manufacturing process, and also that the manufactured goods of this invention does not have an unpleasant odor of miso and has a color of pale yellow and, accordingly, said goods may be utilized in various dishes.

2. Statement of Prior Arts

As the conventional fermented soybean food, miso is well known.

In the manufacture of miso, a large quantity of waste water results, about 7 m$^3$ per one ton of miso, full BOD (biochemical oxygen demand) load about 28 Kg generated. The disposal of this waste water becomes an environmental problem.

In the disposed waste water, especially BOD load when steam cooking the soybean is about 21 Kg and it occupies about 75% of full waste water. One method for removal of the chief ingredient, macromolecular sugar, in the waste water of steam cooking of soybean is being attempted to re-cycle the waste water by concentrating it with reverse osmostic membrane. However, this method is not yet practical.

Further, in the manufacture of miso the soybean must be cooked for a long time, until it becomes soft for fermentation and, accordingly, a large quantity of fuel is required.

Furthermore, miso is used frequently in various dishes for Japanese style meal, including miso soup. However, these dishes are limited to some extent in which the aroma or flavor of miso is compatible.

Furthermore, white miso which is both less in odor and lighter in color has been tested for Western style meals, but this also has not been fully developed for practical use.

As mentioned above, in the conventional manufacturing method of miso, the disposal of harmful waste water causing by steam cooking becomes an environmental or economical problem. Therefore, a new manufacturing method for fermented soybean food similar to miso is expected, in which the quantity of discharging material caused by steam cooking is less.

Further, the consumption of fuel for steam cooking is also expected.

Whereas, with western styled food, high cholesterol count becomes a health problem without distinction of age or sex and, accordingly, vegetable protein, vitamin, mineral, vegetable fiber etc. contained in soybean are now in the limelight. From this point of view, miso is the most beneficial food with the exception of salt, but with western style food the usage of miso is not popular.

One of the reasons for less intake of miso is miso is mainly used for Japanese meals which utilizes the optimum use of smell or flavor contained in miso.

Therefore, as one of the effective utilization of vegetable protein, vitamin, mineral, vegetable fiber contained in soybean, a new fermented soybean food material which has a luscious flavor as miso and compatible with all kinds of dishes by deodorizing odor of miso proper are expected.

SUMMARY OF THE INVENTION

An object of the present invention is to provide a new method for manufacturing fermented soybean food without steam cooking.

The manufacturing method of fermented soybean food of this invention is characterized by roughly breaking soybean into about ½–150 in size, taking off the coat and germ, feeding said roughly broken soybean into a sealed vessel, and after introducing steam at or under 1 Kg/cm$^2$ for 3–20 minutes to avoid cooking the broken soybean, rapidly discharging the broken soybean from the sealed vessel to the outside normal atmospheric pressure and making puff, and then by grinding it into powder, sprinkling hot water of 80°–95° C. onto the powder and inducing fermentation by adding malt and salt.

In the present invention, the reason to maintain the normal temperature at the time of breaking of soybean is to prevent the denaturation of soybean protein etc. by heat and enzymes, and also to prevent the issuance of odious odor of soybean based on the denatured product. Roughly breaking the size of soybean from a half to ⅛ is to increase the surface area with steam, and thus induce the desired effect of puffing at the time of quick discharging from the sealed vessel to the outside normal atmospheric pressure.

Fine breaking as in meal increases the difficulty of the operation due to increase stickiness at the time when steam is introduced. The word "puffing" in the specification means that a phenomenon wherein the roughly broken soybean becomes porous by puffing.

The time for operating of steam varies depending on the sizes of roughly broken soybean, pressure of steam and temperature. If pieces of broken soybean are larger, longer time is needed. On the contrary, if pieces are smaller, a shorter time is required. Operation of steam for small pieces over a long period of time causes stickiness and is undesirable. Further, if the pressure and temperature of steam are so high, the time duration for introducing the steam is correspondingly shorten.

The pressure of the introduced steam is sufficient normally under 1 Kg/cm$^2$ when injected into the sealed vessel. If the pressure is over 1 Kg/cm$^2$, the temperature within the sealed vessel becomes higher and, accordingly, cooking occurs so that adverse condition results such as denaturation of soybean protein etc. will appear.

The invention described in the Japanese Patent Application Publication No. 48(1973)-19946 which corresponding U.S. application issued as U.S. Pat. No. 4,076,851, suggests that texture of soybean is destroyed by pressure and flatness of soybean to the extent that defattiness does not occur. However, in the present invention, there is no need to compress and flatten the soybean in advance, since the texture of the roughly broken soybean being processed by steam is destroyed when said soybean is rapidly discharged from the sealed vessel to the normal atmospheric pressure, it becomes porous by puffing. In order to maintain the full effects of puffing of the present invention, it is preferable to make the processed soybean discharged from the sealed vessel into the atmosphere under decreased atmospheric pressure. However, by selecting of the conditions of steam processing, sufficient puffing may occur even if rapid discharging is made into the normal atmospheric pressure.

Soybean discharged and puffed is further grounded nominally under 100 mesh. Onto this powder, hot water 80°-95° C. is sprayed for pasteurization. Hot or boiled water over 95° C. is undesirable since cooking occurs so that denaturatlon of soybean protein etc. or stickiness may occur.

The malt to be added need not be of specific type and, accordingly malted rice, malted wheat and others may be utilized provided it will ferment the soybean.

Additive time of malt is, in general, when the temperature decrease about to 40° C. after sprinkled with hot water. Additive amount of malt is usually between 50–400% of soybean powder mentioned above. Salt is usually about 5–15% of the whole and water is usually about 100–200% of soybean powder above. Combination of raw materials and the term of fermentation are optional depending on use of the products and/or preference, i.e. from the conventional miso type to material type for cooking of a western meal.

In the method of the present invention mentioned above, the reasons why fermented soybean food which has a pale yellow color and no odious order of miso is produced without cooking, are not entirely defined. However, it is considered that the following operations are concerned in the present invention:

(1) Regarding Unpleasant Odor of Miso

Generally, it is considered that the unpleasant odor of green bean generated by lipoxygenase contained about 1% in full protein of a seed oxidizes the lipid.

In the method of the present invention, the reason for none issuing of soybean odor in the soybean powder is considered that lipoxygenase deactivates at the time that after atomizing of steam, roughly broken soybean is puffed by rapidly discharging into the normal atmospheric pressure. Further, one of the reasons that no odor of miso is generated, is also considered that due to the deactivation of lipoxygenase, formation of substance which attribute odor of miso after cooking of soybean is obstructed.

Furthermore, cooked soybean emits an odor of boiled bean itself which is somewhat different from the odor of green beans. As in the method of this invention, soybean is never cooked entirely through the entire process. This is considered as one of the reasons the odor of miso is not emitted.

Whereas, Japanese Patent Application Publication No. 48(1073)-19946 discloses a method for manufacture of deodorizing impalpable powder of soybean in that to press and flatten the previously washed and rinsed soybean to the extent that no defattiness occurred, to dehydrate it by circulating the low temperature wind to reduce the moisture content to 3%, to break it roughly into about 10 mesh and strip the seed coat, to steam cook the remaining soybean cotilaydon in a boiler for a short time, to deodorize odor of the fat and evaporate the moisture attached and contained within the soybean cotilaydon by vacuum aspiration for a short time, and further to grind into medium and micro pieces successively at constant temperature, are the processes involved.

Therefore, the method for deodorizing of soybean in the present invention is different from the above mentioned prior art.

(2) Regarding Color Hue like Miso

Miso has a peculiar brown hue. Generally, soybean changes to a pale yellowish brown after cooking. This color gradually deepens during fermentative aging of miso. Miso ages for a long time changes color to a brackish brown.

However, soybean powder per se processed by the present invention is a pale yellow as the soybean powder is produced by non-cooking. It is considered soybean powder is fermented without cooking, therefore, coloring materials which occur by decomposing of polysaccharide etc. do not form, and that polysaccharide is not to be decomposed easily by malt.

(3) Regarding Non-Cooking Fermentation

In the manufacture of miso, it is necessary to cook soybean over a long time to facilitate fermentation. However, in the method of the present invention, fermentation of soybean may be possible without cooking in accordance with the operations mentioned hereinafter.

Whereas, in the method of the present invention, soybean puffs rapidly and becomes of porous texture, by means of rapidly discharging to normal atmospheric pressure after spraying steam within the sealed container. Powder made of the puffed soybean by smashing has a suction rate of 2.5 times greater in comparison to normal soybean. Further, pepsin digestion rate of a normal soybean is fairly low. However, pepsin digestion rate of the puffed soybean powder of the present invention achieve up to 97%. Due to change of texture mentioned above, fermentation by malt is possible without cooking.

DETAILED DESCRIPTION OF THE PREFERRED EMBODIMENTS

(1) Manufacture of Soybean Powder

Carefully selected soybean from which impurities are removed is divided into the size of ½–¼ thereof at and under ordinary temperature condition and coat reduced and germ are stripped, and thereafter only the broken soybean is separated by utilizing wind velocity. Then the broken soybean is supplied into a cylindrical sealed vessel in which a screw conveyer is provided, through a rotary bulb or valve, located at one end of the upper portion of the sealed vessel. The shaft of the screw conveyer is placed below the central axis of the cylindrical sealed vessel and thereby a space is provided between the upper portion of the screw conveyer and the upper inner wall of the sealed vessel. Injection of steam by nozzle are arranged along the available space with a force under 1 $Kg/cm^2$ normally 0.5 $Kg/cm^2$. The steam injected on the broken soybean during its forward movement by the screw conveyer and discharged through a rotary bulb or valve which is provided on the lower portion of the vessel and situated at the other end of the screw conveyer. At this time, the broken pieces of soybean in the pocket of the rotary bulb puffs rapidly for a moment when exposed to the atmosphere resulting in the release of pressure therein. In the above, the average stay period of time of divided soybean is normally about 10 minutes and the average moisture content of soybean is about 15%. The resulting puffed soybean is grinded under 100 mesh. Average moisture content of this soybean powder is about 7%.

(2) Manufacture of Fermented Soybean Food

In the above mentioned soybean powder, a small quantity of hot water 80°–95° C. is sprinkled thereon and agitated. After agitating it is undisturbed for 40–60 minutes and when the temperature has dropped to about 40° C., malted rice 1 kg manufactured in the conventional way, salt 350 g and water total combined weight becomes 3.6 Kg, are added to 1 Kg of the soybean powder and they are mixed and grounded. This mixture is put into the tub and covered with a cloth, a stone is placed thereon as a weight and induces natural fermentation in a greenhouse at about 30° C. Fermentative aging period may be different depending upon the purpose of use or taste. In the present invention, two kinds of products are produced. One has a fermentative aging period of 20–30 days (hereinafter called as 'A') and the other is of 30–60 days (hereinafter called as 'B').

Furthermore, the third product is produced in the same manner mentioned above in which mixture of the material are different, namely, malted rice is 2 Kg, salt is 400 g and water total becomes 5 Kg are added against soybean powder above.

All of these products have no odor of miso and are pale yellow in color and has a luscious taste same as miso.

(3) Sensory Test

Sensory test was made to confirm that no odor of miso is generated.

12 rice bowl size are prepared and for comparison of 2 brands of red miso available on the market (hereinafter called 'C' and 'D' respectively) and 2 brands of white miso available on the market (hereinafter called 'E' and 'F' respectively) are also prepared.

For the products 'A' and 'B' produced by the method of the present invention, 2 samples of soup of 100 ml each, namely 4 samples in total, are prepared. By melting each product with 50 g in boiled water, and poured into 4 cups respectively.

As for miso available on the market 'C', 'D', 'E' and 'F', 2 samples each of soup 100 ml, namely 8 samples in total are prepared by melting each with 10 g in boiled water and poured in the remaining 8 cups.

These bowls containing the samples were covered by gauze to mask the appearance of its contents and arranged at random.

10 persons were selected at random in which were included housewives and students and made a thorough examination for the presence of miso odor.

The result, all 10 persons answered that the products 'A' and 'B' produced in the present invention had no odor of miso.

(4) Utilization of the Products in the Present Invention

Potato soup

Potato soup was prepared in the manner that to the product 250 g relating to the present invention, 2 glasses of water were added, and 4 small sized potatoes and a middle sized onion were placed therein and cooked, cheese 60 g and a dash of spice such as pepper etc. were added.

Catsup soup

Catsup soup was prepared in the manner that to the product 250 g relating to the present invention, one and a half glass of water and butter 50 g were added, and one middle sized onion was placed therein and cooked, and thereafter catsup 200 g, cheese 60 g and a dash of spice such as pepper etc. were added.

In sampling the results of these soups, after the sensory test, by the above 10 judges, each soup was appraised by all that the taste of the soup was western style. Furthermore, the judges were astonished to learn the novel soybean prepared in this invention were among those tested.

The manufacturing method of fermented soybean food in the present invention makes possible the production of fermented soybean food without cooking as it has a constitution and a operation as mentioned above. As the result, no waste water for preparation of fermented soybean food occurs. Thus the environmental problem caused by waste water control and/or using by establishment etc. of waste water treatment equipments become unnecessary.

Further, in the method of the present invention, fuel consumption for generation of steam, which is utilized during a stage of manufacturing soybean powder, is about 25–30% required for manufacturing the conventional miso, and in the method of the present invention, fuel utilized for preparing hot water for spraying of soybean powder is about 25–30% used in comparisons to manufacturing by conventional miso and, accordingly, the total amount of fuel to be consumed through the all processes of manufacturing method of the present invention is 50–60% of that required to the conventional method of manufacturing miso.

Furthermore, fermented soybean food manufactured by the method of the present invention has no odor of miso in spite of none was discharged by steam, and as it is of pale yellow color, effective nutriment, i.e. plant protein, vitamin, mineral, food fiber etc. contained in the soybean can be fully utilized. Thus fermented soybean food of the present invention may be utilized in the various field not only for Japanese meal but also western meal and, accordingly, the present invention will be a great contributing factor of nation's health hereinafter.

We claim:

1. A method of manufacturing fermented soybean food without cooking comprising:
    breaking soybean into ½–⅛ in size to provide roughly broken soybean;
    taking off coat and germ from each of said roughly broken soybean;
    feeding said roughly broken soybean into a sealed vessel;
    introducing steam into said sealed vessel at a preselected pressure for 3–20 minutes to avoid cooking said roughly broken soybean, said preselected pressure being at or under 1 Kg/cm$^2$;
    rapidly discharging said broken soybean from the sealed vessel to outside normal atmospheric pressure so that said broken soybean are puffed;
    grinding said puffed broken soybean into powder;
    sprinkling hot water at a preselected temperature onto said powder to avoid cooking said powder, said preselected temperature being 80°–95° C.; and
    inducing the fermentation of said powder by adding malt and salt;
    whereby the fermented soybean food is void of any odor of miso and has effective nutriment contained in the soybean due to manufacture thereof without cooking.

2. A method of manufacturing fermented soybean food without cooking according to claim 1, wherein the amount of said malt is 50–400% of the soybean powder, said salt is 5–15% of the whole and said water is 100–200% of the soybean powder.

* * * * *